(12) United States Patent
Takehara et al.

(10) Patent No.: US 6,363,722 B1
(45) Date of Patent: Apr. 2, 2002

(54) PRETENSIONER WITH GAS ESCAPE MECHANISM

(75) Inventors: Hiroki Takehara; Hikaru Kameyoshi; Hiromasa Tanji; Joji Mishina, all of Shiga (JP)

(73) Assignee: Taktaka Corporation, Tokyo (JP)

(*) Notice: Subject to any disclaimer, the term of this patent is extended or adjusted under 35 U.S.C. 154(b) by 0 days.

(21) Appl. No.: 09/644,679

(22) Filed: Aug. 24, 2000

(30) Foreign Application Priority Data

Aug. 25, 1999 (JP) .......................................... 11-238784

(51) Int. Cl.⁷ ............................................... F01B 29/08
(52) U.S. Cl. .......................................... 60/632; 60/638
(58) Field of Search ........................... 60/632, 634, 638

(56) References Cited

U.S. PATENT DOCUMENTS

| | | | |
|---|---|---|---|
| 4,444,010 A | 4/1984 | Bendler ........................ | 60/407 |
| 5,303,631 A | * 4/1994 | Frehaut et al. ............. | 60/638 X |
| 5,450,723 A | * 9/1995 | Fohl .............................. | 60/638 |
| 5,690,295 A | 11/1997 | Steinberg et al. ........... | 242/374 |
| 5,875,634 A | 3/1999 | Wohlenbert et al. | |
| 5,881,962 A | 3/1999 | Schmidt et al. ............. | 242/374 |

FOREIGN PATENT DOCUMENTS

| | | |
|---|---|---|
| DE | 195 45 795 | 12/1995 |
| DE | 199 09 938 | 8/2000 |
| EP | 0 680 856 | 3/1995 |
| WO | WO 95/27638 | 10/1995 |
| WO | WO 96/25310 | 8/1996 |

* cited by examiner

*Primary Examiner*—Hoang Nguyen
(74) *Attorney, Agent, or Firm*—Foley & Lardner

(57) ABSTRACT

To provide a pretensioner with further improved safety of the device, wherein gas is appropriately allowed to escape in the event that the gas pressure within the pipe rises excessively. A pretensioner is attached to the outer side of the frame of a seatbelt retractor. A pressure container is connected to the base portion of a pipe of the pretensioner. A gas generator is stored within this pressure container. Multiple balls are provided within the pipe. A hole is opened in the side wall of the pipe at the portion positioned between the gas generator and ball. A rivet or other device is driven into this hole. The rivet breaks in the event that internal pressure exceeding a certain pressure (i.e., abnormal pressure) is applied to the pipe, and falls loose from the hole. Alternative embodiments of gas escape mechanisms are provided.

12 Claims, 15 Drawing Sheets

FIG. 6(A)
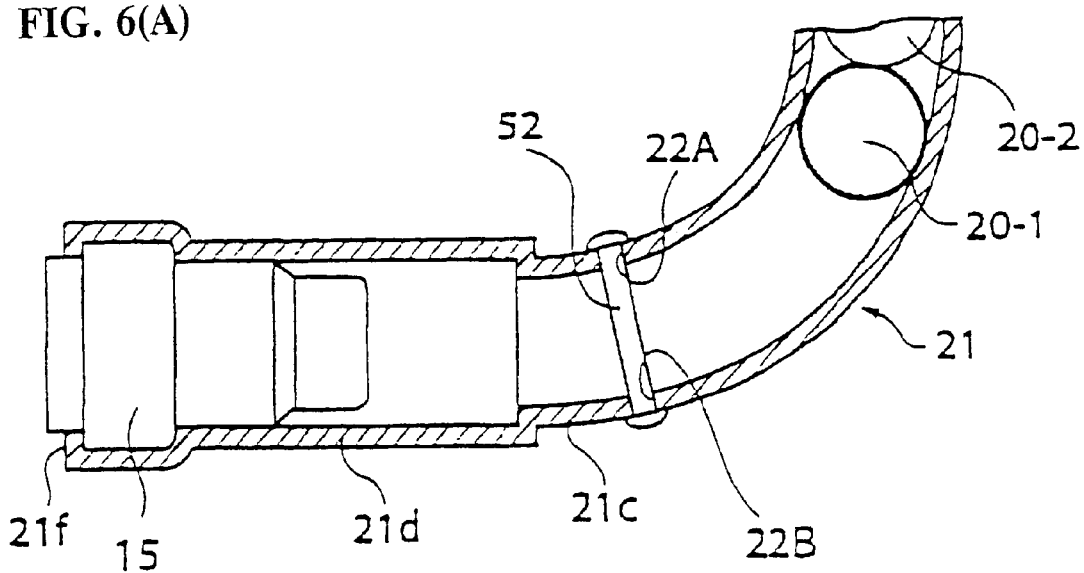
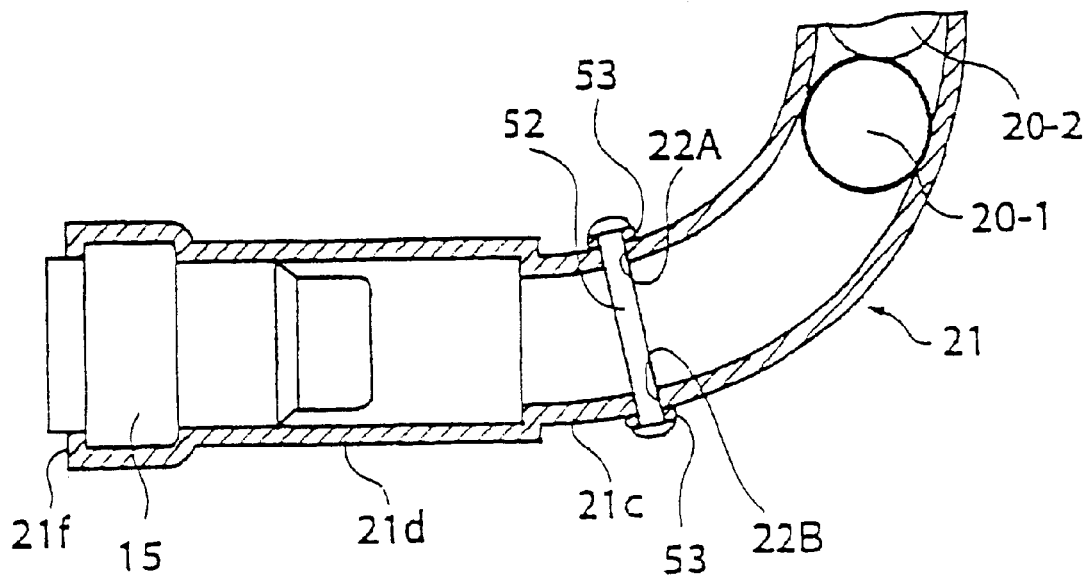
FIG. 6(B)

PRETENSIONER WITH GAS ESCAPE MECHANISM

This application is related to Japanese Patent Application No. H11-238784, filed on Aug. 25, 1999, the disclosure of which is hereby incorporated by reference in its entirety.

FIELD OF THE INVENTION

The present invention relates to a pretensioner that is built into a seatbelt device for restraining passengers to the seats of vehicles and the like, for rotating the take-up shaft for a seatbelt in the take-up direction in an emergency. More particularly, the present invention relates to a pretensioner with improved safety, wherein gas is allowed to escape in the event that the internal gas pressure rises excessively and there are decreased adverse effects on other equipment.

BACKGROUND OF THE INVENTION

In recent years, an increasing number of seatbelt devices with pretensioners have been provided to vehicles, principally automobiles. A pretensioner is for instantaneously rotating the reel (take-up shaft) on which the seatbelt is wound in the take-up direction in the event of a vehicle collision, thereby taking up the slack in the belt and providing the belt with tension. The device driving this pretensioner generally ignites gunpowder according to a detection signal emitted at the time of collision of the vehicle, and drives a reel rotating mechanism by gas pressure generated by the explosion of gunpowder. A conventional example of such a pretensioner is the pretensioner disclosed in DE19545795-C1 (97-166921/16) or U.S. Pat. No. 5,875,634, for example. FIG. 17(A) is a perspective view illustrating the configuration of the pipe base portion of the above pretensioner, and FIG. 17(B) is a frontal cross-section view of the same part.

This pretensioner has a pipe 110. An attachment portion 111 is formed at the end of the pipe 110. This attachment portion 111 is formed so as to be somewhat greater in diameter than the pipe 110. A sleeve 114 is fixed at the inner side of the attachment portion 111. A gas generator 113 is stored within the sleeve 114. Further, a hole 115 is formed to the side wall of the attachment portion 111.

The gas generator 113 explodes in response to the signal at the time of collision of the vehicle, and discharges high-pressure gas within the pipe 110. The belt take-up mechanism is driven by the energy of this gas. Now, in the event that abnormal pressure exceeding the normal operating pressure occurs within the pipe 110, the interior portion of the hole 115 bursts, and the gas pressure of the gas generator 113 blows out of here. Thus, generation of dangerously high pressure within the pipe 110 can be prevented.

However, with the above conventional pretensioner, the position at which to form the hole 115 from which gas pressure blows out is restricted to a narrow range on the side wall of the attachment portion 111. Accordingly, the layout for dealing with blowout of gas and flames is difficult.

The present invention has been made in light of the above problems, and it is an object thereof to provide a pretensioner with improved safety, wherein gas is allowed to escape appropriately in the event that the internal gas pressure rises excessively, thus improving safety of the device even further.

SUMMARY OF THE INVENTION

In order to solve the above problems, the pretensioner according to a first embodiment of the present invention is a pretensioner for rotating the take-up shaft of a seatbelt in the take-up direction in the event of an emergency to provide the belt with pretension, comprising: a gas generator; a driving member accelerated by the gas generated by the gas generator; a path for storing and guiding the driving member; a channel for guiding the gas to the path; means for converting the motion of the accelerated driving member into force for rotating the take-up shaft; and gas bypass means for discharging the gas out from the channel in the event that internal pressure exceeding a certain pressure (i.e., abnormal pressure) is applied to the channel; wherein the gas bypass means includes a hole provided to the side wall of the channel, and a plugging material which normally plugs off the hole. With the pretensioner according to the first embodiment of the present invention, the plugging material may be a rivet.

With this embodiment of the present invention, in the event that there is internal pressure exceeding a certain pressure (i.e., abnormal pressure) in the channel, the plugging member blows out under this abnormal pressure and the hole opens, so gas escapes from this hole. Accordingly, excessively great pressure can be prevented from occurring within the channel. In this case, there is the advantage that the gas escaping means can be configured in an inexpensive and simple manner.

Also, with the pretensioner according to the first embodiment of the present invention, two holes may be provided opposing the cross-sectional radial direction of the channel, with the plugging material being a through rivet plugging both holes.

In this case there is the advantage that the work of attaching the rivet to the channel can be carried out easily. Also, the hole boring for the channel can be performed by a punching process of a through hole, which is easier.

Further, with the pretensioner according to the first embodiment of the present invention, an O-ring may be introduced between the outer surface of the channel and the end of the rivet. In this case, the gap between the hole and rivet is sealed by the O-ring. Accordingly, there is less gas leakage under normal pressure.

Also, with the pretensioner according to the first embodiment of the present invention, the plugging member may be a resin cap having an air hole; wherein the resin cap is arranged such that the air hole is plugged in the event that the internal pressure of the channel is the normal gas generator generating pressure; and wherein the resin cap detaches from the channel in the event that the internal pressure within the channel is an abnormal pressure. In this case, the air hole is released in the event that pressure decreases following operation, thereby preventing pressure from remaining within the channel.

The pretensioner according to a second embodiment of the present invention is a pretensioner for rotating the take-up shaft of a seatbelt in the take-up direction in the event of an emergency to provide the belt with pretension, the pretensioner comprising: a gas generator; a driving member accelerated by the gas generated by the gas generator; a path for storing and guiding the driving member; a channel for guiding the gas to the path; means for converting the motion of the accelerated driving member into force for rotating the take-up shaft; and gas bypass means for discharging the gas out from the channel in the event that internal pressure exceeding a certain pressure (i.e., abnormal pressure) is applied to the channel; wherein the gas bypass means includes a hole provided to the side wall of the channel, and a sleeve which normally plugs off the hole disposed within the channel. With the pretensioner according to the second embodiment of the present invention, a protrusion protruding into the hole is preferably provided to the portion of the sleeve which corresponds with the hole.

In this case, there is the advantage that not only is there no gas leakage under normal conditions, gas is discharged only under abnormal conditions. In this case, there is the advantage that the gas pressure within the channel readily converges on the protrusion. Also, fitting the protrusion into the hole also acts to fix the sleeve.

The pretensioner according to a third embodiment of the present invention is a pretensioner for rotating the take-up shaft of a seatbelt in the take-up direction in the event of an emergency to provide the belt with pretension, the pretensioner comprising: a gas generator; a driving member accelerated by the gas generated by the gas generator; a path for storing and guiding the driving member; a channel for guiding the gas to the path; means for converting the motion of the accelerated driving member into force for rotating the take-up shaft; and gas bypass means for discharging the gas out from the channel in the event that internal pressure exceeding a certain pressure (i.e., abnormal pressure) is applied to the channel; wherein the gas bypass means includes a tear line (a side wall portion prepared so as to readily tear in the event that abnormal pressure is applied). With the pretensioner according to the third embodiment of the present invention, the gas bypass means may comprise a hole opened in the side wall of the channel, with this hole being plugged off by the material to which the tear line is provided.

With this embodiment, the channel itself has a gas escaping mechanism, so there is the advantage that additional parts are not necessary. In this case, there is the advantage that the gas escaping pressure can be set by the material to which the tear line is provided.

The pretensioner according to a fourth embodiment of the present invention is a pretensioner for rotating the take-up shaft of a seatbelt in the take-up direction in the event of an emergency to provide the belt with pretension, the pretensioner comprising: a gas generator; a driving member accelerated by the gas generated by the gas generator; a path for storing and guiding the driving member; a channel for guiding the gas to the path; means for converting the motion of the accelerated driving member into force for rotating the take-up shaft; and gas bypass means for discharging the gas out from the channel in the event that internal pressure exceeding a certain pressure (i.e., abnormal pressure) is applied to the channel; wherein the gas bypass means includes a keeper for fixing the gas generator at the end portion of the channel, and is configured such that a gap is created between the keeper and channel in the event of abnormal pressure.

Gas is discharged from the gap between the keeper and the channel in the event of abnormal pressure. Such an arrangement has the advantage that addition parts for gas discharge are unnecessary.

With the pretensioner according to the fourth embodiment of the present invention, an arrangement may be employed wherein a hole is opened at the side wall of the keeper and also an elastic material is introduced between the keeper and the gas generator, wherein the hole is normally plugged by the perimeter surface of the gas generator, and wherein the hole is released in the event of abnormal pressure by the elastic member shrinking and the gas generator moving. In this case, there is the advantage that the discharge pressure of the hole can be set according to the type of elastic material.

The pretensioner according to a fifth embodiment of the present invention is a pretensioner for rotating the take-up shaft of a seatbelt in the take-up direction in the event of an emergency to provide the belt with pretension, the pretensioner comprising: a gas generator; a driving member accelerated by the gas generated by the gas generator; a path for storing and guiding the driving member; a channel for guiding the gas to the path; means for converting the motion of the accelerated driving member into force for rotating the take-up shaft; and gas bypass means for discharging the gas out from the channel in the event that internal pressure exceeding a certain pressure (i.e., abnormal pressure) is applied to the channel; wherein the path is a channel and the driving member moves along the inner surface of the channel; and wherein a piston is further provided to the end of the driving member, and a small hole is opened in the side wall of the channel at the position where this piston passes in the initial stage of being accelerated; and wherein the diameter of the small hole is of a size which allows pressure necessary for normal operation to be maintained within the channel and also does not allow an excessive pressure in the event that the movement of the piston is obstructed. Incidentally, the piston can move to the position for discharging the hole, even in the event that the take-up shaft does not rotate.

The fifth embodiment of the present invention is advantageous in that there is no leakage of gas and pressure can be maintained until the initial stage of the piston starting movement.

BRIEF DESCRIPTION OF THE DRAWINGS

FIGS. 6(A) and (B) are frontal cross-section views illustrating the configuration of the pipe base portion of the pretensioner according to the second embodiment of the present invention.

DETAILED DESCRIPTION OF THE PREFERRED EMBODIMENTS

Figure 1:
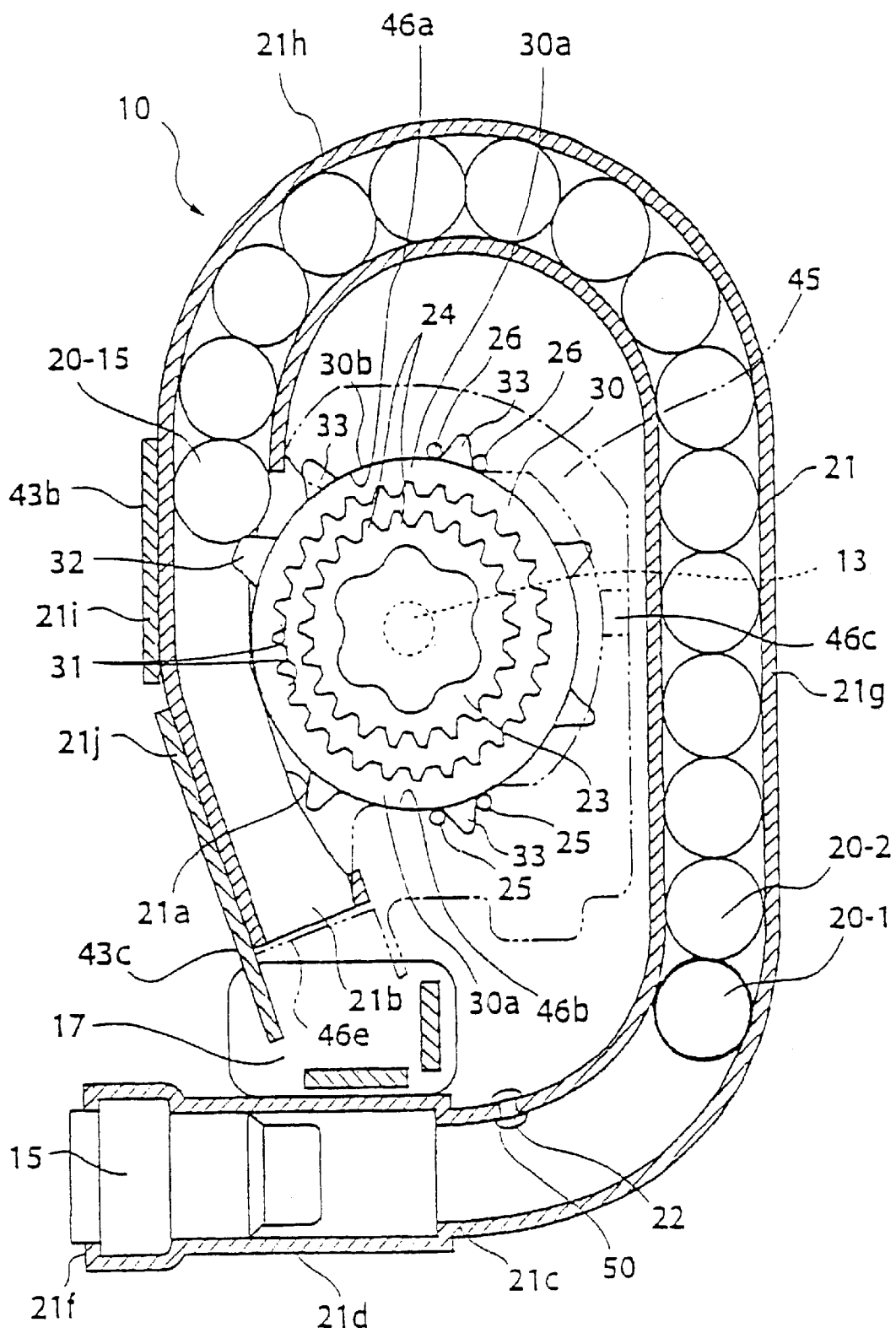
FIG. 1 is a frontal cross-section view illustrating the state before the pretensioner operates according to the first embodiment of the present invention.
Figure 2:
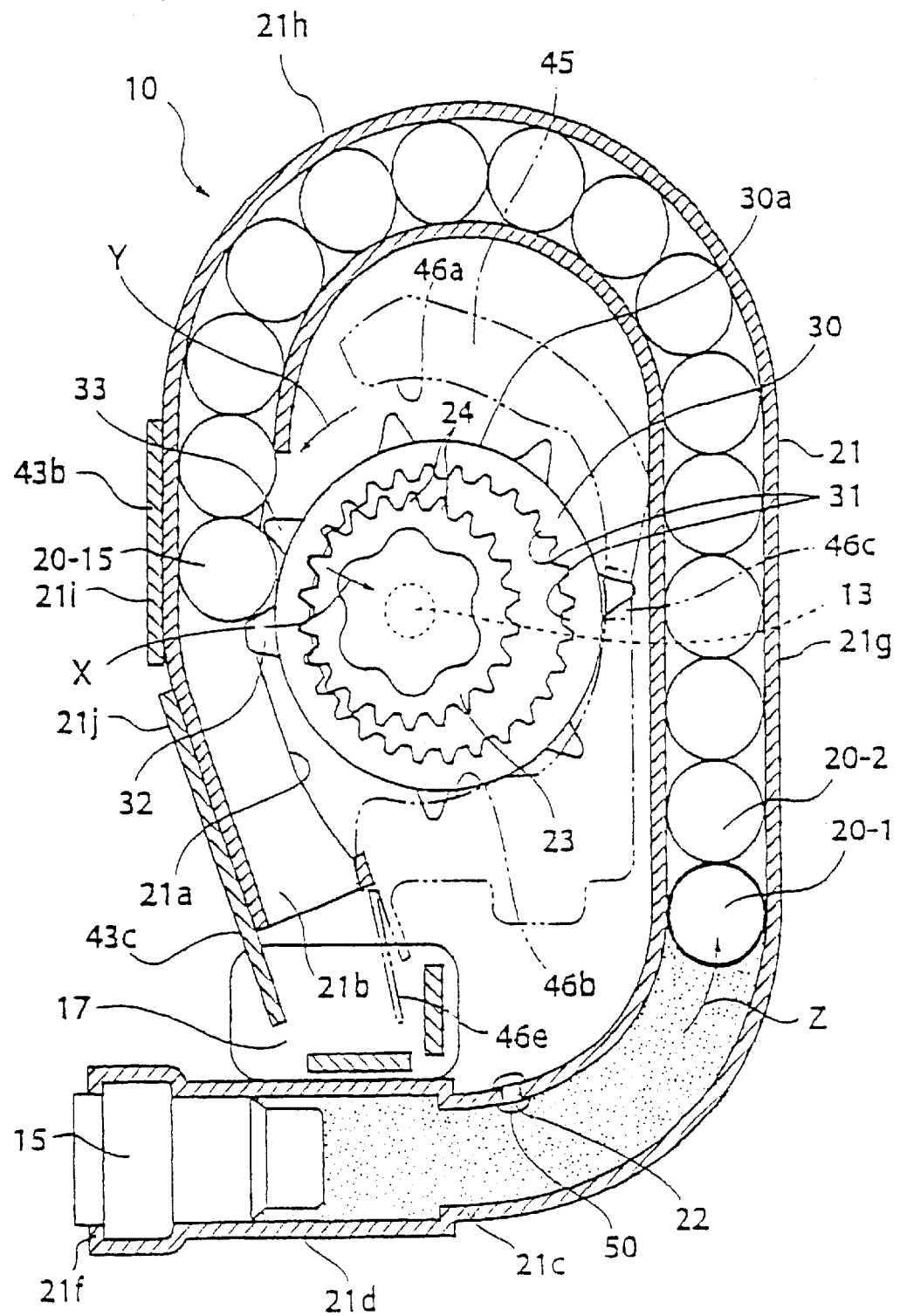
FIG. 2 is a frontal cross-section view illustrating the state of the pretensioner immediately after the gas generator ignites.
Figure 3:
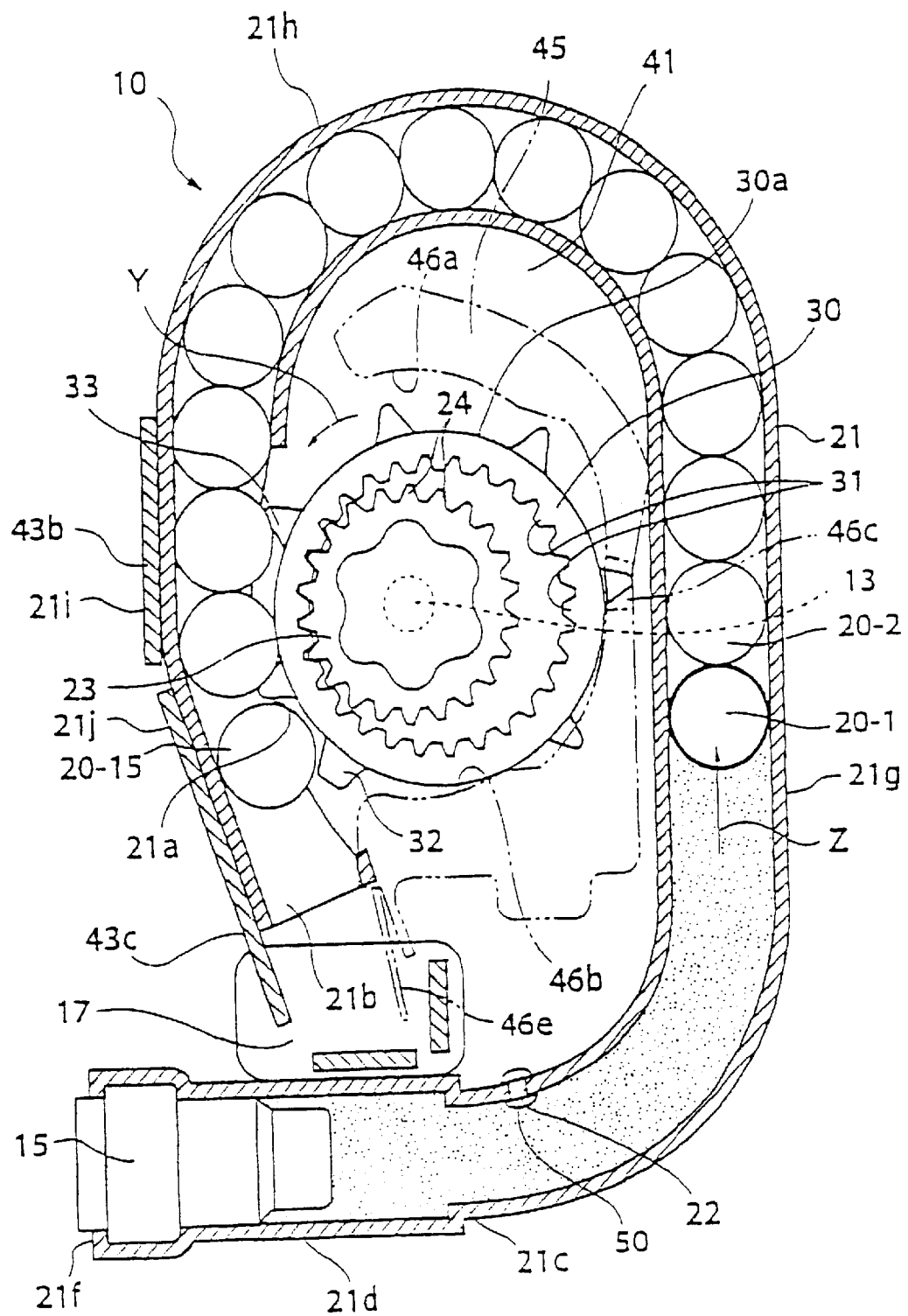
FIG. 3 is a frontal cross-section view illustrating the state of the pretensioner immediately after starting take-up of the belt.
Figure 4:
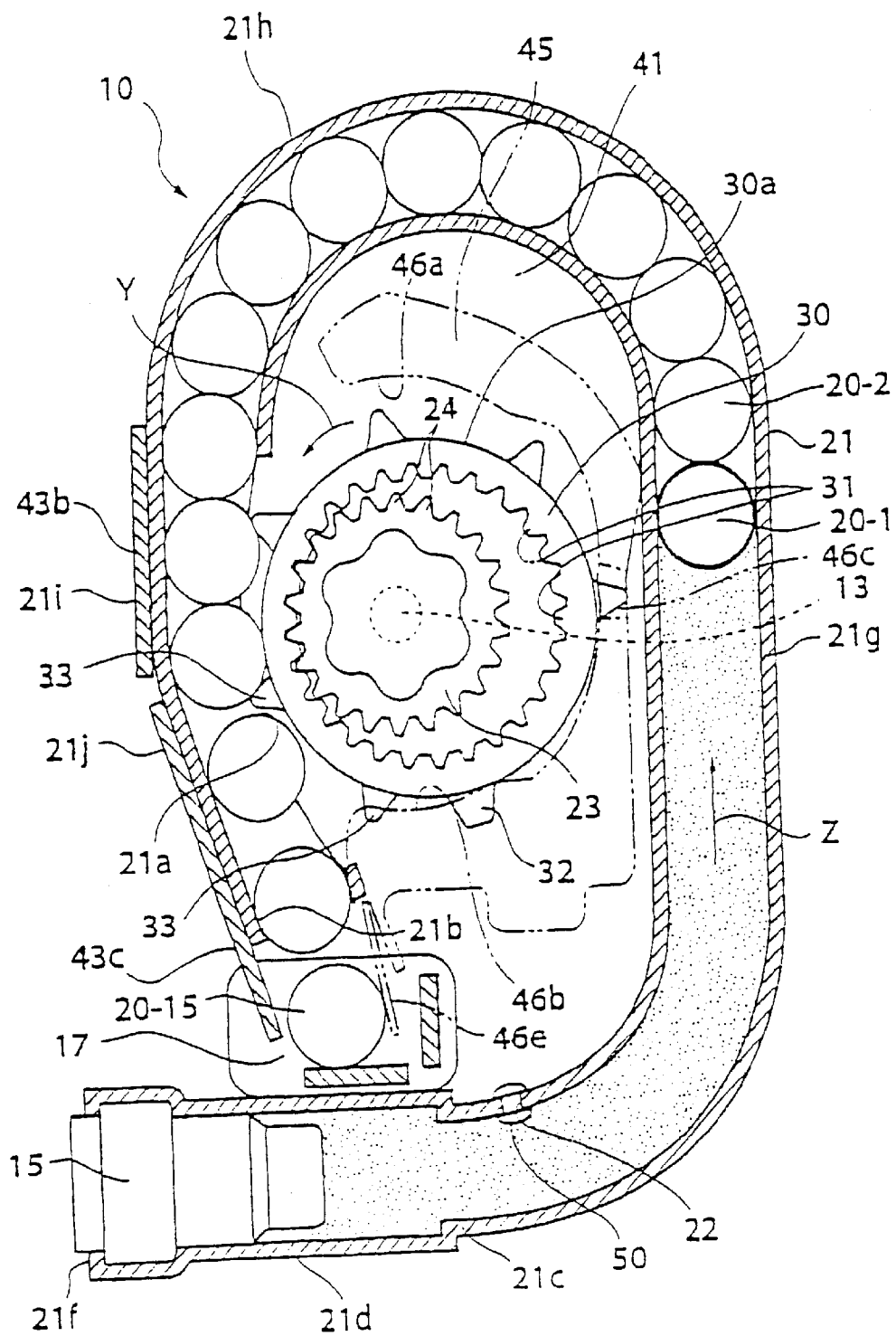
FIG. 4 is a frontal cross-section view illustrating the state of the pretensioner partway through taking up the belt.
Figure 5:
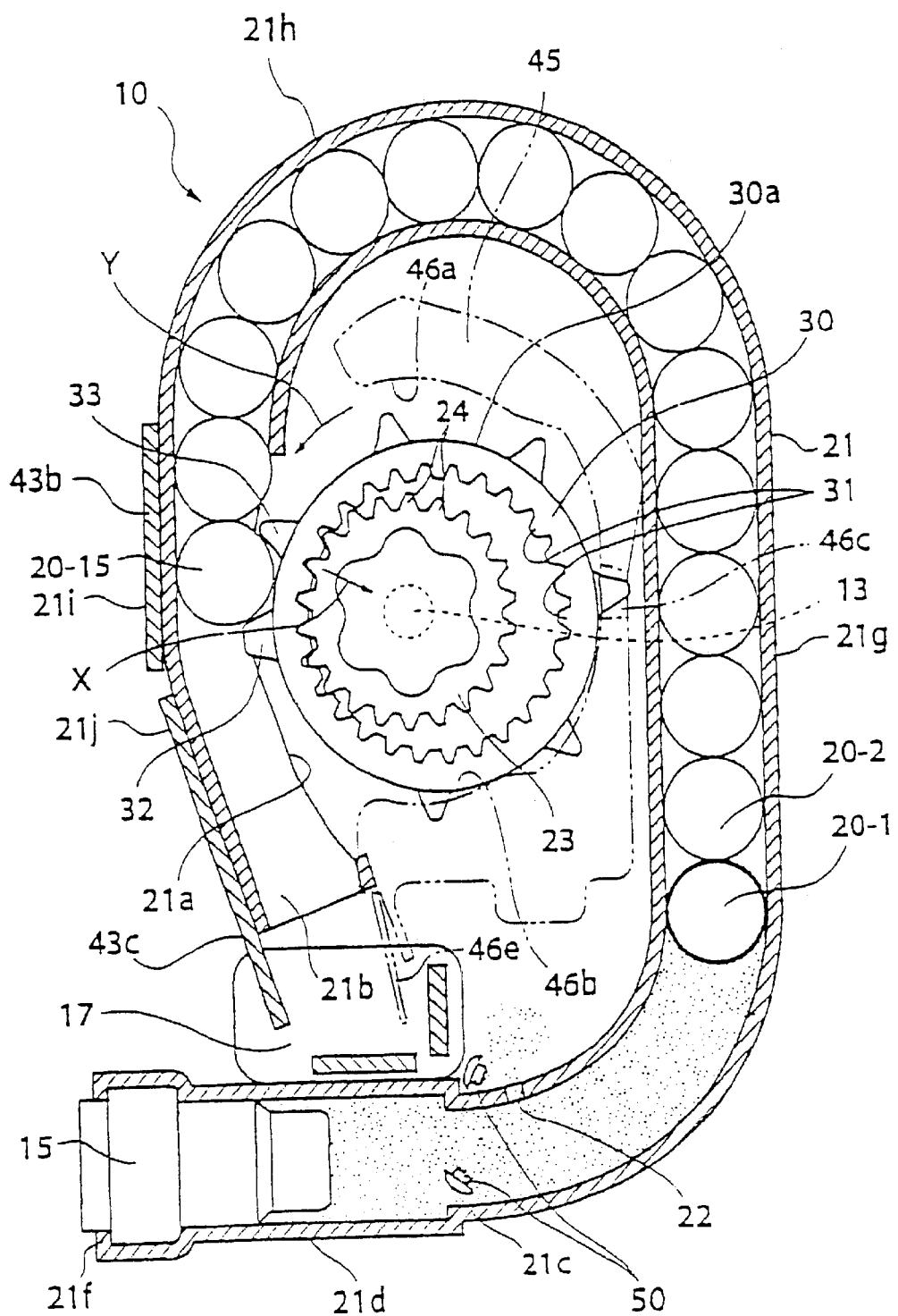
FIG. 5 is a frontal cross-section view illustrating the state of the pretensioner in the event of abnormal pressure occurring.

The following is a description with reference to the drawings:

FIG. 1 through FIG. 5 are diagrams illustrating the configuration of the pretensioner according to a first embodiment of the present invention, and the operation thereof. FIG. 1 is a frontal cross-section view illustrating the state before the pretensioner operates. FIG. 2 is a frontal cross-section view illustrating the state immediately after the gas generator ignites. FIG. 3 is a frontal cross-section view illustrating the state immediately after starting take-up of the belt. FIG. 4 is a frontal cross-section view illustrating the state partway through taking up the belt. FIG. 5 is a frontal cross-section view illustrating the state in the event of abnormal pressure occurring.

The pretensioner 10 shown in these Figures is assembled into the seatbelt retractor. The seatbelt retractor is provided with a reel onto which the belt is wound, a return spring for pressing the reel in the take-up direction, an emergency lock mechanism for preventing rotation of the reel in the belt extracting direction in the event that the vehicle decelerates rapidly, and so forth. These seatbelt retractor components are not shown in the Figures, but are conventionally known.

The pretensioner 10 is attached to the outer side of the frame of the seatbelt retractor. The pretensioner 10 has a pipe 21. This pipe 21 is formed by bending a steel tube (as an example). The pipe 21 bends to the upward right direction from the base 21c at the lower part of FIG. 1 at an approximately 90° angle so as to connect to the linear portion 21g, and further connect to the half-circle portion 21h at the upper portion of the FIG. 1. The tip of the half-circuit portion 21h connects to a linear portion 21i heading downwards in the diagram, with a linear portion 21j slightly inclined inwards being connected to the tip thereof. A tip hole 21b opens at the tip of this final linear portion 21j.

A notched portion 21a notched so as to allow introduction of a ring gear 30 is provided to the inner side of the linear portions 21i and 21j closer to the tip hole 21b of the pipe 21. Levers 32 and 33 of the ring gear 30 enter into the notched portion 21a.

The pipe 21 is bent, which means the overall external dimensions of the pretensioner 10 can be made small. Also, freedom in design is improved as compared to arrangements restricted to linear forms for the pipe. Incidentally, the pipe 21 may be bent in other various forms as well, such as being bent three-dimensionally, and so forth.

A pressure container 21d in the form of a pipe having somewhat a greater diameter than the pipe 21 is connected to the base portion 21c of the pipe 21. A gas generator 15 is stored within this pressure container 21d. This gas generator 15 is for igniting gunpowder based on detection signals emitted from unshown collision detecting means at the time of collision of the vehicle, and supplying gas pressure to the pipe 21. This gas generator 15 is fixed by externally caulking the flange portion 21f following being placed within the pressure container 21d.

Multiple (fifteen in FIG. 1) balls 20 are provided within this pipe 21. Of these, the balls 20-2 through 20-15 excluding the ball 20-1 closest to the gas generator 15 are metal spheres such as aluminum spheres. The external diameter of these balls 20-2 through 20-15 is somewhat smaller than the internal diameter of the pipe 21, with a relative clearance (e.g., there is clearance of 0.4 mm for the external diameter of the balls which is 10.6 mm). The leading ball 20-15 essentially is in contact with the lever 32 of the ring gear 30.

On the other hand, the ball 20-1 closest to the gas generator 15 is formed of a resin such as silicone rubber. The ball 20-1 serves as a piston following the ignition of the gas generator 15. The ball 20-1 comes into close contact with the inner surface of the pipe 21 by deforming and spreading following ejection of gas in the event that the pressure within the pipe 21 is normal, and further serves as a seal to prevent gas from leaking to the leading side.

A hole 22 is opened in the side wall of the pipe 21 at the portion positioned between the gas generator 15 and the ball 20-1. A rivet 50 is driven into this hole 22. The rivet 50 is arranged so as to break and come loose from the hole 22 in the event that internal pressure exceeding a certain pressure (i.e., abnormal pressure) is applied within the pipe 21.

Next, the mechanism for converting the motion of the ball 20 (driving members) into rotation of the take-up shaft will described as shown in FIG. 1 and others, a gear holder 45 having a recessed form is fit into the inner side of the pipe 21. The gear holder 45 is formed of a bendable and deformable resin material. Two pins 25 and 26 each are erected at two opposing places on this gear holder 45. The pins 25 and 26 nip the levers 33 of the later-described ring gear 30 in the state before operation of the pretensioner 10 (the state in FIG. 1).

A take-up shaft 13 fixed to the above reel passes through the gear holder 45 on the inner side of the pipe 21. The take-up shaft 13 is provided along the axial center of the reel and rotates synchronously with this reel. A pinion 23 is fixed at the periphery of the take-up shaft 13. This pinion 23 has outer teeth 24 uniformly over the entire periphery thereof.

A ring gear 30 is provided at the perimeter area of the pinion 23. This ring gear 30 has inner teeth 31 capable of meshing with the outer teeth 24 of the pinion 23 uniformly over the entire inner circumference thereof. Note that the outer teeth 24 of the pinion 23 and the inner teeth 31 of the ring gear 30 are not meshing in the state before operation of the pretensioner 10 (the state in FIG. 1). The outer teeth 24 and the inner teeth 31 have forms capable of meshing smoothly, such as disclosed in Japanese Unexamined Patent Application Publication 5-162615.

A plurality of protruding levers 32 and 33 extending outwards are provided to the perimeter surface of the ring gear 30, at predetermined intervals. Of these levers, one (reference numeral 32) has a particularly larger flat form at the apex of the protrusion as compared to the other lever 33. A trapezoid-shaped valley is formed between these adjacent levers 32 and 33. This valley is capable of engaging a later-described ball.

The two pins 25 and 26 each erected on the gear holder 45 each nip the two levers 33 opposed across the axial center of the ring gear 30. Thus, the ring gear 30 is held at a predetermined position within the gear holder 45. The inner circumference diameter of the ring gear 30 is formed so as to be greater than the outer circumference diameter of the pinion 23, so a clearance is secured between the inner teeth 31 of the ring gear 30 and the outer teeth 24 of the pinion 23 in the state shown in FIG. 1, and the two are not meshed. Accordingly, the take-up shaft 13 can freely rotate regardless of the presence of the pretensioner 10. This is the state wherein clutch mechanism formed of the pinion 23 and the ring gear 30 is disengaged.

On the other hand, a case 17 is provided to the tip of the tip hole 21b of the pipe 21. This case 17 is for storing the balls 20 discharged out from the pipe 21. A guide plate 43c exists between the end of the pipe 21 and the case 17. The case 17 serves to gather the balls 20 discharged out from the pipe 21 at one place.

Next, description will be made regarding the operation of the pretensioner 10 thus configured. At the non-operating state (normal state) of the pretensioner 10, the ring gear 30 is held at a fixed position by the pins 25 and 26 of the gear holder 45, and the ring gear 30 and pinion 23 do not mesh, as shown in FIG. 1. Subsequently, in the event that a vehicle collision state is detected, a detection signal is transmitted to the gas generator 15. As shown in FIG. 2, the gas generator 15 ignites in response to this detection signal, and gas pressure is supplied within the pipe 21. Due to this gas pressure, the ball 20-1 closest toward the gas generator 15 is pressed forwards as a piston. This pressing force sequentially presses the multiple balls 20, and the pressing force reaches the leading ball 20-15 (the ball in contact with the lever 32 of the ring gear 30).

At this time, the ball 20-1 is flattened in the direction of operation of the gas pressure (the direction of the arrow Z) by the gas pressure and the reaction of pressing the ball 20-2. Due to this flattening, the outer diameter of the ball 20-1 expands in the direction orthogonal to the operation direction of the gas pressure. Accordingly, the contact plane pressure of the ball 20-1 against the inner plane of the pipe 21 increases, so as to generate the sealing function.

The pressing force is placed on the ring gear 30 by the pressing force of the balls 20, and the pins 25 and 26 are sheared off. Accordingly, the ring gear 30 moves in the direction X in FIG. 2, and the inner teeth 31 of the ring gear 30 and the outer teeth 24 of the pinion 23 mesh. Following moving in the direction X in FIG. 2, the ring gear 30 rotates around the coaxial center by the force of the balls 20 pressing the lever 32. At the point before the ring gear 30 starts to move, the leading ball 20-15 is in contact with the lever 32 of the ring gear 30, maintaining a force thereon so as to be able to apply rotating force thereto, so the lever 32 starts rotating in a sure manner without locking.

Further, once the balls 20 are sequentially pressed out by the gas pressure, the balls 20 sequentially are engaged with the valley between the levers 33 of the ring gear 30. There is clearance between the balls 20-2 through 20-15 and the pipe 21, so the balls proceed smoothly. The ring gear 30 rotates in the direction Y shown in FIG. 2 through FIG. 4 by means of these balls 20 sequentially being engaged. The pinion outer teeth 24 and the ring gear inner teeth 31 are meshed, so the rotation of the ring gear 30 is transferred to the pinion 23, and both rotate together. At this time, the number of pinion outer teeth 24 is greater than the number of ring gear inner teeth 31, which generates a speed-increasing effect, and the pinion 23 rotates at a faster angular speed than the ring gear 30.

Further, the take-up shaft 13 and reel are fixed to the pinion 23, so the reel rotates and the belt is instantaneously taken up by a certain length in the take-up direction. Note that the rotation angle of the reel at the time of the pretensioner operating is greater than the rotating angle of the ring gear 30 due to the above speed-increasing operation, which increases the length of the seatbelt being taken in by the pretensioner 10.

The balls 20 pressed out from the tip hole 21b of the pipe 21 are collected in the case 17, as shown in FIG. 4. The case 17 collects the balls 20 ejected from the pipe 21 in one place. Accordingly, ease of the processing following the operation of the pretensioner 10 is facilitated.

Now, in the event that internal pressure exceeding a certain pressure (i.e., abnormal pressure) is applied within the pipe 21 following the operation of the pretensioner 10, this abnormal pressure breaks the rivet 50 which falls loose. Once the rivet 50 falls loose, the hole 22 opens as shown in FIG. 5, and gas is ejected from this hole 22. The rivet 50 which has come loose is stored within the case of the pretensioner 10. Thus, gas within the pipe 21 can be appropriately made to escape. Incidentally, though needless to mention, the pretensioner driving mechanism and take-up shaft rotating mechanism according to the present invention are not restricted to this example; rather, various forms may be used.

The rivet 50 can be made to break in one of several ways, either alone or in combination. The rivet 50 can be made of a suitable material that it will crack under a predetermined pressure. Alternatively, the rivet 50 may be made to crack along tear or stress lines formed in the rivet 50, along which a crack would proceed when sufficient pressure is applied to rivet 50.

Description will be further made regarding other embodiments of the pretensioner according to the present invention. With each of the following configurations, gas is appropriately discharged in the event that there is abnormal pressure within the pipe 21. Incidentally, in the following description, explanation of components which are the same as those in the first embodiment will be omitted.

The following is a description of the second embodiment of the present invention with reference to FIG. 6. FIGS. 6(A) and (B) are frontal cross-section views illustrating the configuration of the pipe base portion of the pretensioner relating to the second embodiment of the present invention.

With the pretensioner shown in FIG. 6(A), two holes 22A and 22B are opened in the side wall of the pipe 21 facing one another in the diameter direction of the pipe 21, at a position between the gas generator 15 and the ball 20-1. A single through rivet 52 is driven through these holes 22A and 22B, so as to pass through both holes. This through rivet is broken in the event that abnormal pressure is applied to the pipe 21, and comes loose from the holes 22A and 22B. This rivet maybe made to crack above a predetermined gas pressure, as described above. Such a configuration is advantageous in that ease of attaching the rivet is facilitated. The pretensioner shown in FIG. 6(B) is a variation of the pretensioner shown in FIG. 6(A), with O-rings 53 introduced between the outer surface of the pipe 21 and the edge portions of the through rivet 52. Such a configuration is advantageous in that there is little leakage of gas in normal operation.

Figure 7A:
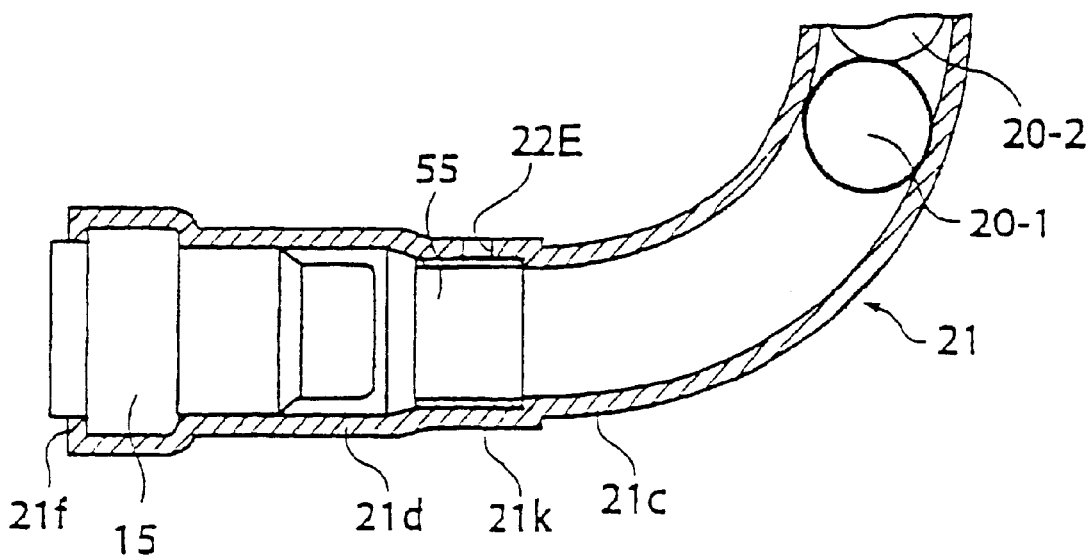
FIGS. 7(A) and (B) are frontal cross-section views illustrating the configuration of the pipe base portion of the pretensioner relating to the third embodiment of the present invention.

The following is a description of the third embodiment of the present invention with reference to FIG. 7. FIGS. 7(A) and (B) are frontal cross-section views illustrating the configuration of the pipe base portion of the pretensioner relating to the third embodiment of the present invention.

With the pretensioner shown in FIG. 7(A), a pipe-shaped sleeve attaching portion 21k is integrally formed between the base portion 21c of the pipe 21 and the pressure container 21d. The diameter of the attaching portion 21k is somewhat greater than that of the base portion 21c, and somewhat smaller than that of the pressure container 21d. A sleeve 55 is fixed to the inner side of the attaching portion 21k. Further, a hole 22E is formed to the side wall of the attaching portion 21k. This pretensioner is arranged such that in the event that there is abnormal pressure generated in the pipe 21, the portion of the sleeve 55 corresponding to the hole 22E breaks, and gas is discharged from the hole 22E.

Figure 7B:
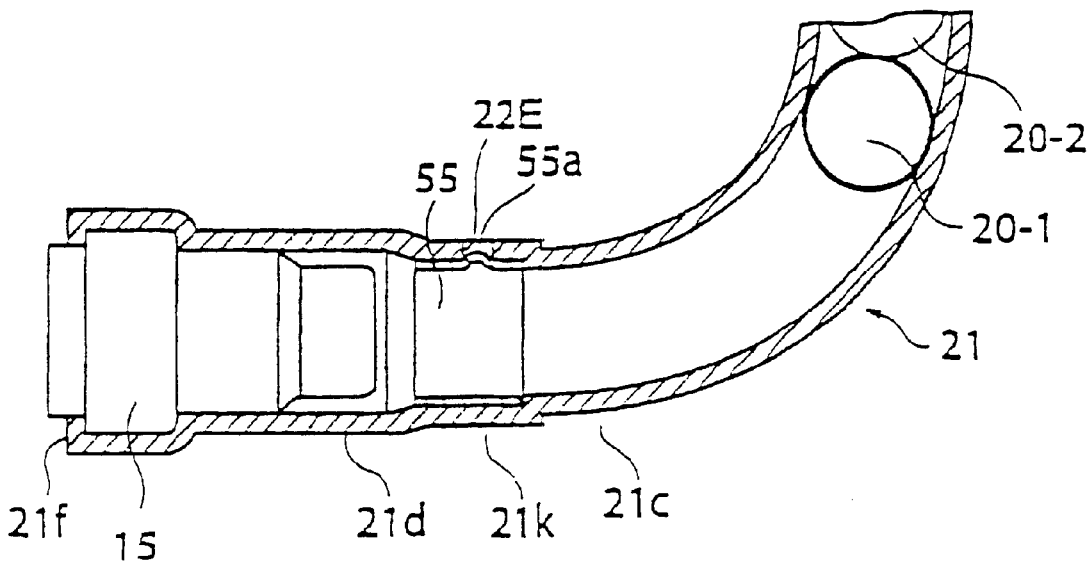

On the other hand, the pretensioner shown in FIG. 7(B) is an arrangement wherein a protrusion 55a is formed to the pretensioner shown in FIG. 7(A) at the position on the sleeve 55 corresponding to the hole 22E. Providing the protrusion 55a allows the gas pressure within the pipe 21 to readily converge on the protrusion 55a. At the time of setting the sleeve 55 within the pipe 21, the sleeve 55 is pressed in and the set position is matched with the protrusion 55a.

Figure 8:
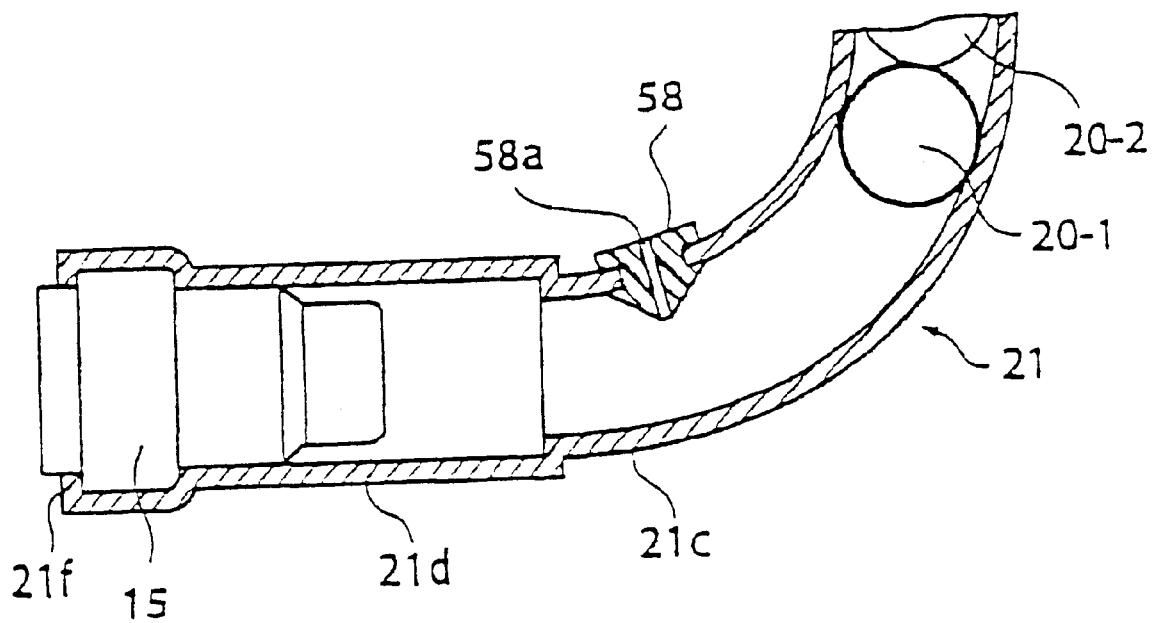
FIG. 8 is a frontal cross-sectional view of the configuration of the pipe base portion of the pretensioner according to the fourth embodiment of the present invention.
Figure 9A:
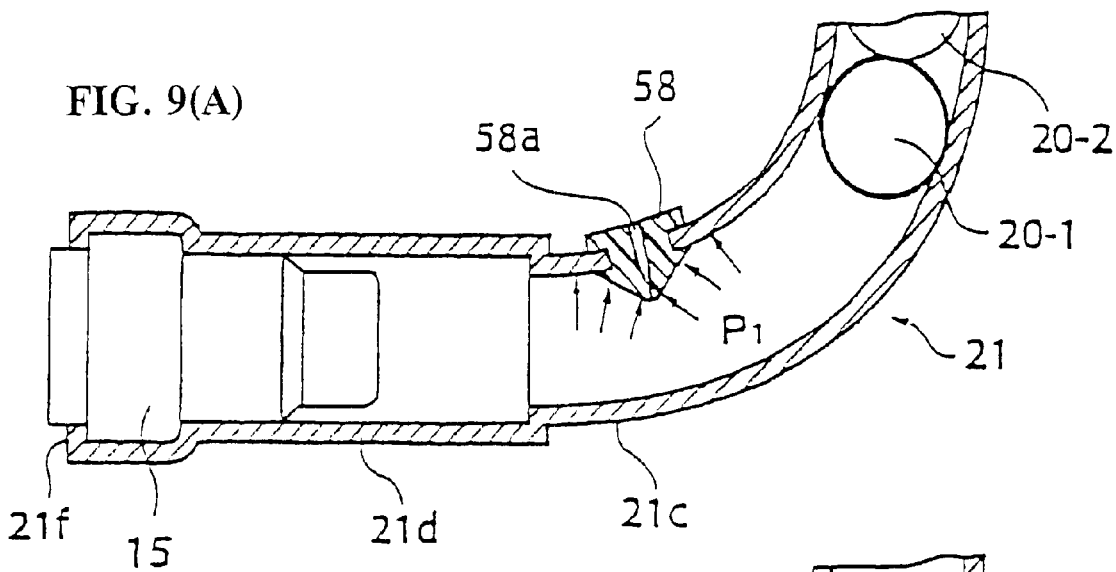
FIGS. 9(A) through (C) each are frontal cross-sectional views for describing the operating form of the pretensioner shown in FIG. 8.
Figure 9B:
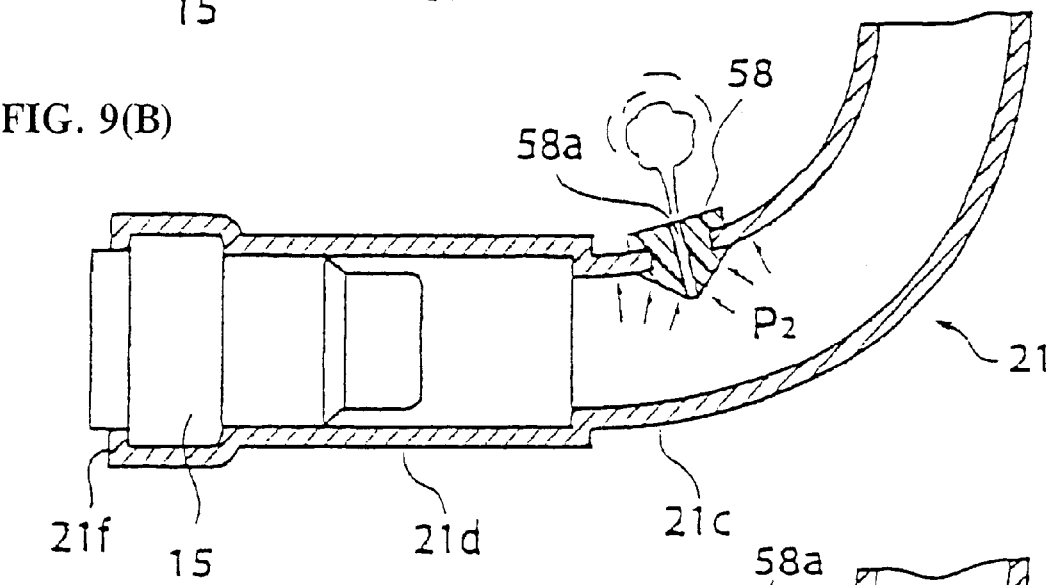
Figure 9C:
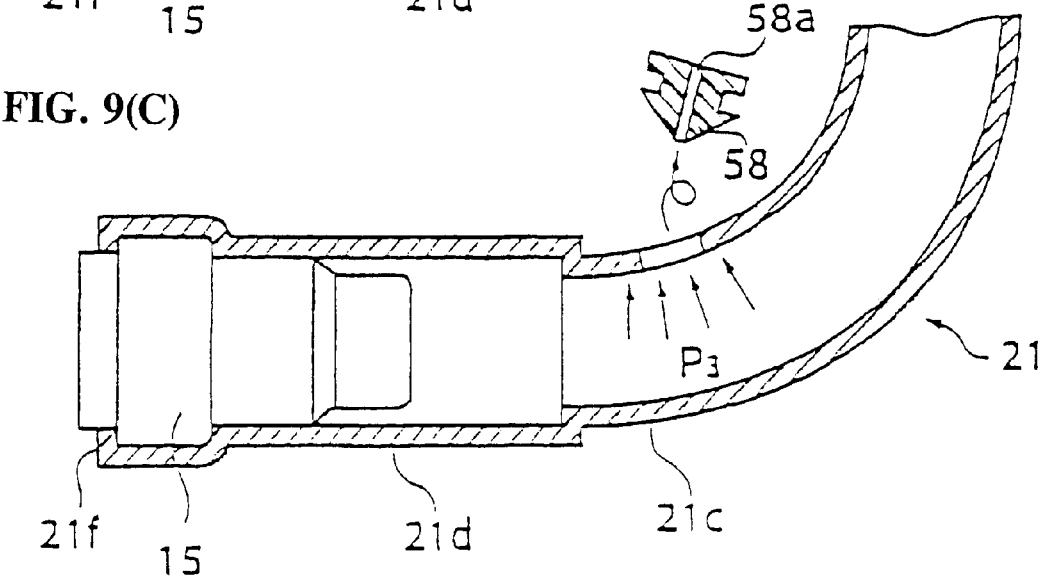

The following is a description of the fourth embodiment of the present invention, with reference to FIG. 8 and FIG. 9. FIG. 8 is a frontal cross-sectional view of the configuration of the pipe base portion of the pretensioner according to the fourth embodiment of the present invention. FIGS. 9(A) through (C) are frontal cross-sectional views for describing the operating form of the pretensioner shown in FIG. 8.

With the pretensioner shown in these drawings, a hole 57 is opened in the side wall of the pipe 21 at the portion positioned between the gas generator 15 and the ball 20-1. A resin cap 58 is fit into the hole 57. This resin cap 58 has an air hole 58a. In the state that the internal pressure of the pipe 21 is the normal pressure P1 of the pretensioner operating, the air hole 58a of the resin cap 58 is pressed by this normal pressure P1 and is plugged, as shown in FIG. 9(A). Then, as shown in FIG. 9(B), following normal operation of the pretensioner, the internal pressure of the pipe 21 drops below the normal pressure P1 (this pressure referred to as P2), and the air hole 58a opens and gas is discharged. On the other hand, in the event that abnormal pressure, P3 is applied to the pipe 21 as shown in FIG. 9(C), the resin cap 58 itself comes loose, and the gas is discharged from the hole 57.

Figure 10:
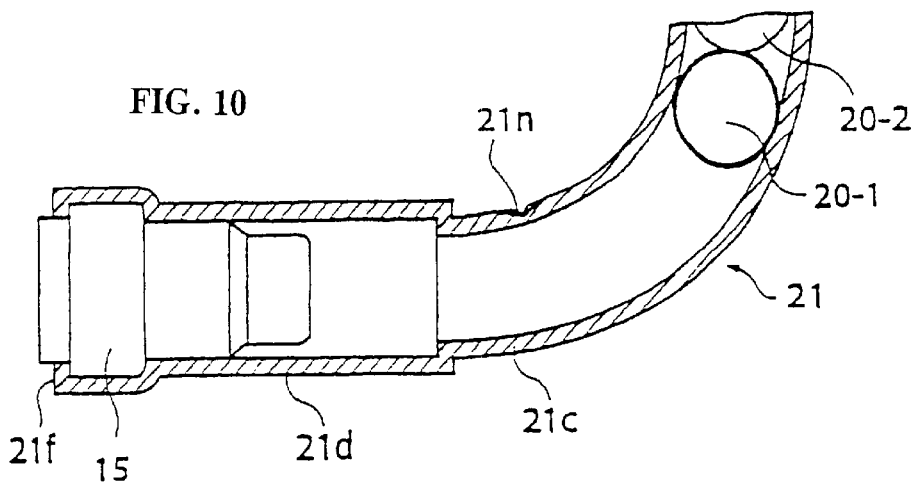
FIG. 10 is a frontal cross-sectional view illustrating the configuration of the pipe base portion of the pretensioner according to the fifth embodiment of the present invention.
Figure 11A:
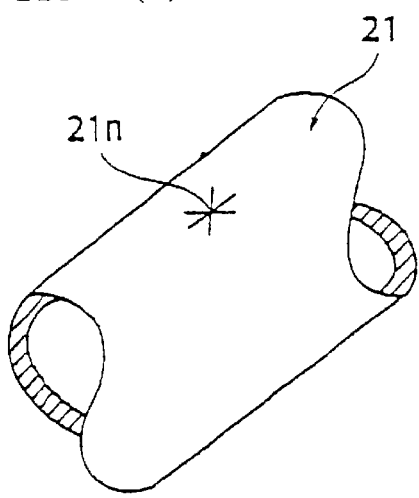
FIGS. 11(A) and (B) are partial enlarged perspective views of FIG. 10.
Figure 11B:
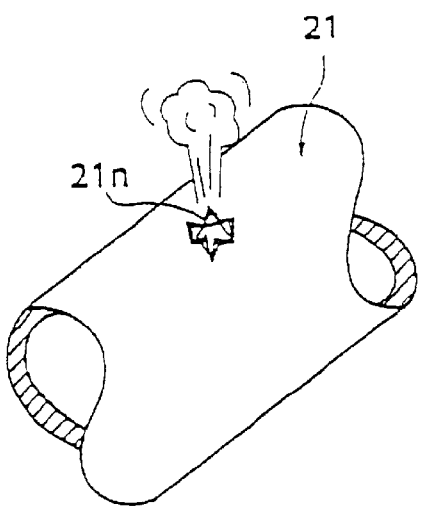
Figure 12A:
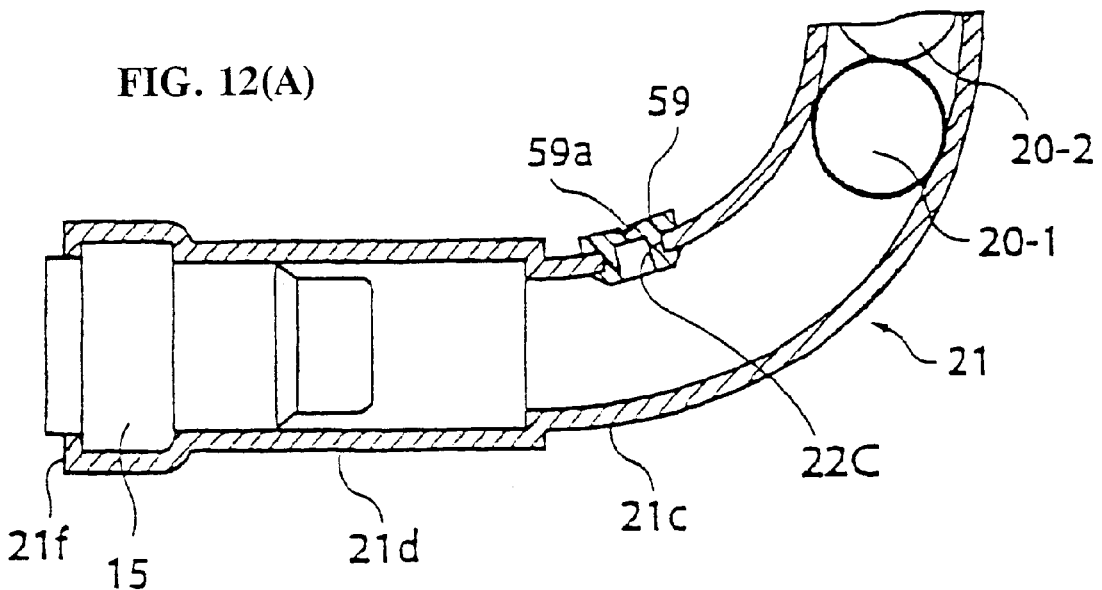
FIG. 12(A) is a frontal cross-sectional view illustrating the configuration of the pipe base portion of a pretensioner other than that shown in FIGS. 10 and 11.
Figure 12B:
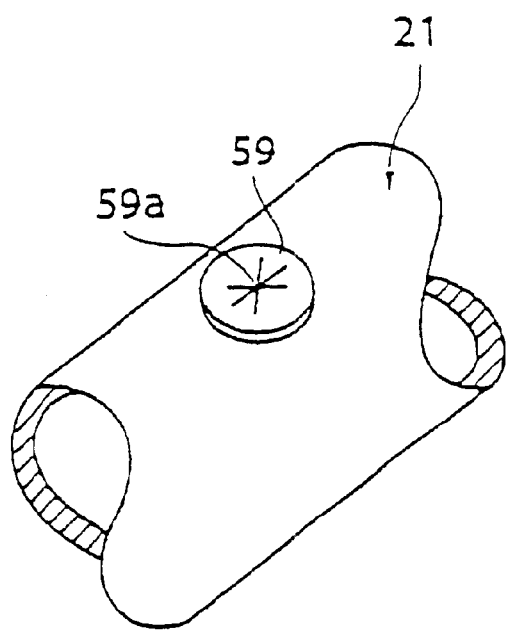
FIG. 12(B) is a partial enlarged perspective view of FIG. 12(A).

The following is a description of the fifth embodiment of the present invention, with reference to FIG. 10 through FIG. 12. FIG. 10 is a frontal cross-sectional view illustrating the configuration of the pipe base portion of the pretensioner according to the fifth embodiment of the present invention. FIGS. 11(A) and (B) are partial enlarged perspective views of FIG. 10. FIG. 12(A) is a frontal cross-sectional view illustrating the configuration of the pipe base portion of a pretensioner other than that shown in FIGS. 10 and 11, and FIG. 12(B) is a partial enlarged perspective view of FIG. 12(A).

With the pretensioner shown in FIG. 10 and FIG. 11, a tear line 21n is formed in the inner side of the side wall of the pipe 21 at the portion positioned between the gas generator 15 and the ball 20-1. The tear line 21n is formed by gouging out the side wall of the pipe 21 to make it thinner. The tear line 21n bursts in the event that abnormal pressure is applied within the pipe 21, as shown in FIG. 11(B).

On the other hand, with the pretensioner shown in FIG. 12 a hole 22C is formed in the side wall of the pipe 21 at the portion positioned between the gas generator 15 and the ball 20-1. A resin cap 59 is fit into the hole 22C. A tear line 59a is formed to this resin cap 59. This tear line 59a also tears in the event that abnormal pressure is applied within the pipe 21, as with the above tear line 21n.

Figure 13A:
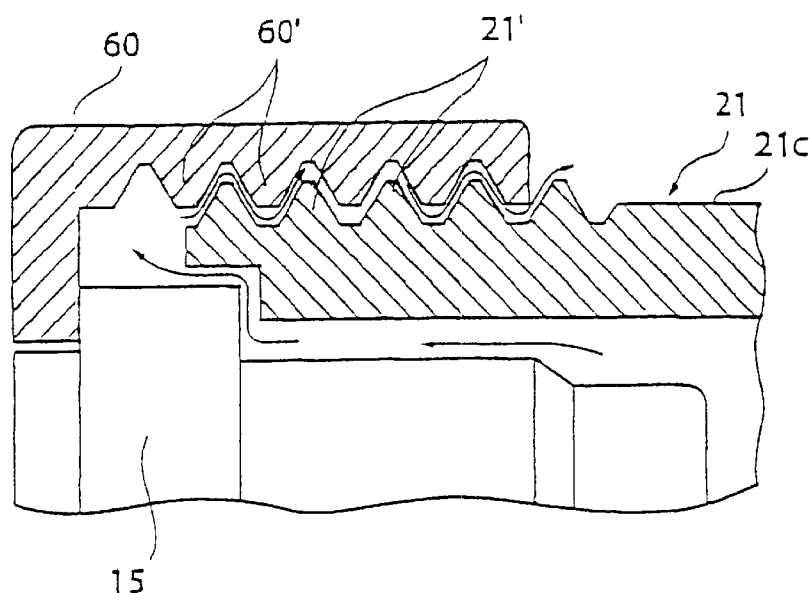
FIG. 13(A) is a frontal cross-sectional view illustrating the configuration of the pipe base portion of the pretensioner according to the sixth embodiment of the present invention, and FIGS. 13(B) and (C) are disassembled perspective views of the same.
Figure 13B:
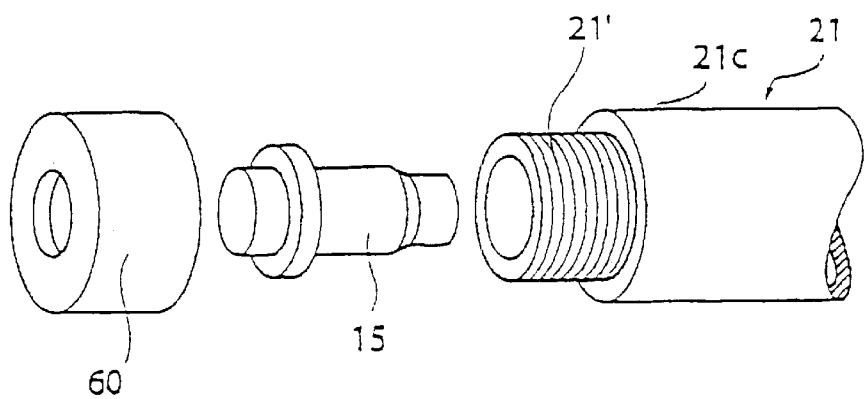
Figure 13C:
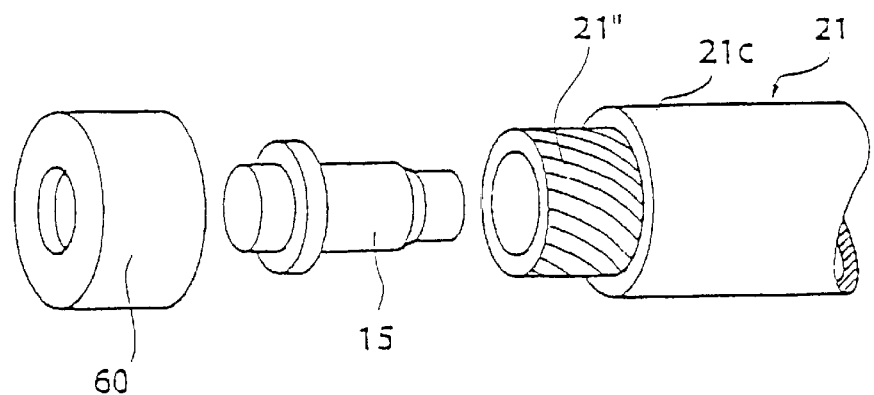
Figure 14A:
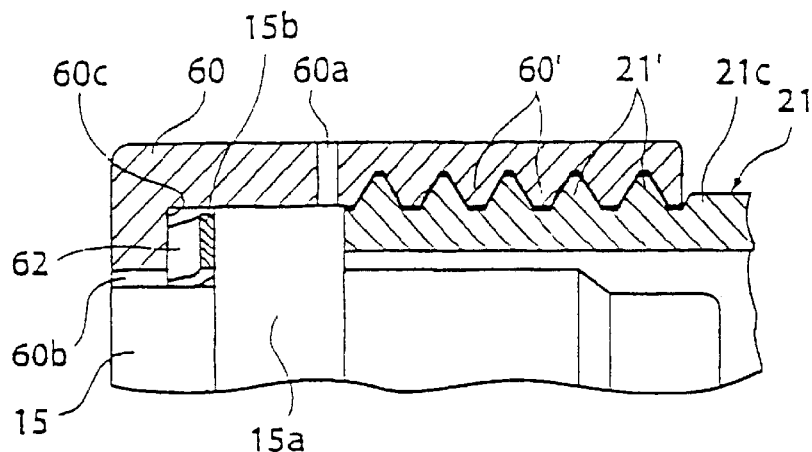
FIGS. 14(A) and (C) are frontal cross-sectional views illustrating the configuration of the pipe base portion of a pretensioner other than that shown in FIG. 13.
Figure 14B:
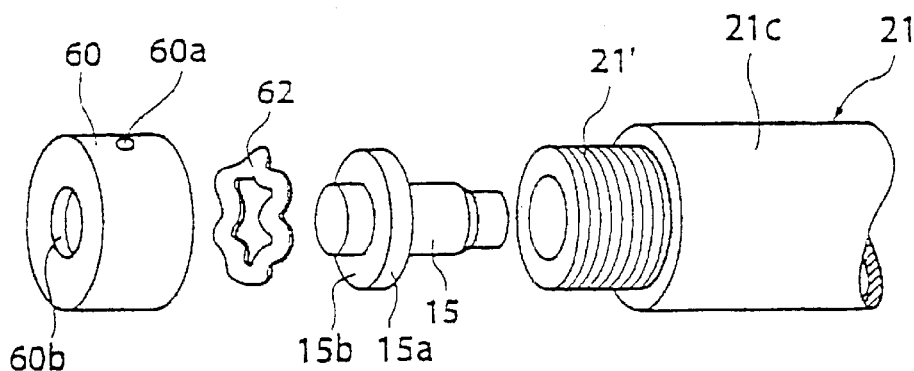
FIG. 14(B) is a disassembled perspective view of the same.

The following is a description of the sixth embodiment of the present invention, with reference to FIG. 13 and FIG. 14. FIG. 13(A) is a frontal cross-sectional view illustrating the configuration of the pipe base portion of the pretensioner according to the sixth embodiment of the present invention, and FIGS. 13(B) and (C) are disassembled perspective views of the same. FIGS. 14(A) and (C) are frontal cross-sectional views illustrating the configuration of the pipe base portion according to a variation of the pretensioner shown in FIG. 13, and FIG. 14(B) is a disassembled perspective view of the same.

The pretensioner shown in FIG. 13 has male threads 21' cut on the base outer circumference surface of the pipe 21. The gas generator 15 is fixed to the base of the pipe 21 by a keeper 60. The keeper 60 is cylindrical. Female threads 60' which screw to the male threads 21' of the base of the pipe 21 are formed on the inner circumference surface of the keeper 60. The pitch of the male threads 21' and the female threads 60' is great, such that there is a gap when the two are tightened down. At the time of tightening the male threads 21' and the female threads 60', a sealing material such as sealing tape is wrapped on the threads. This sealing material prevents gas from leaking during normal operation of the pretensioner. However, in the event that abnormal pressure is generated within the pipe 21, the seal material deforms, and gas is discharged in the direction of the arrow between the male threads 21' on the outer circumference surface of the base and the female threads 60' on the inner circumference surface of the keeper 60.

Note that, as shown in FIG. 13(C), increasing the screwing angle of the male threads 21' and the female threads 60' results in the keeper 60 being pressed and easily loosened in the event that abnormal pressure is generated. This may be employed to allow gas to escape.

The pretensioner shown in FIG. 14 has the following configuration attached to the pretensioner shown in FIG. 13:

(1) A hole 60a is formed to the side wall of the keeper 60. The hole 60a is formed at the deep side of the frame threads 60' (to the left in FIG. 14).

(2) A spring 62 is held between the left edge plane 15b of an extended portion 15a of the gas generator 15 and the inner edge plane 60c of the keeper 60.

Figure 14C:
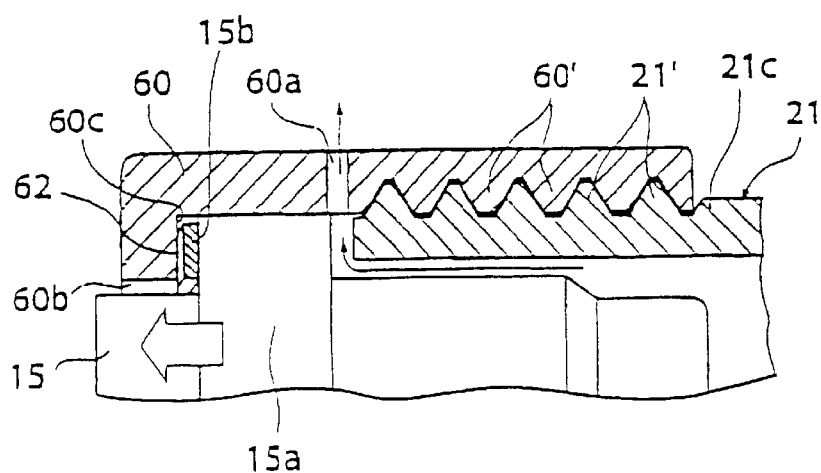

With this pretensioner, in a normal state, the hole 60a is plugged by the perimeter surface of the extended portion 15a of the gas generator 15, as shown in FIG. 14(A). Once abnormal pressure occurs in the pipe 21, the gas generator 15 is pressed by the abnormal pressure and moves to the left side, as shown in FIG. 14(C). At this time, the spring 62 is pressed and is compressed, and also the hole 60a is released, so that gas is discharged following the arrow.

Figure 15:
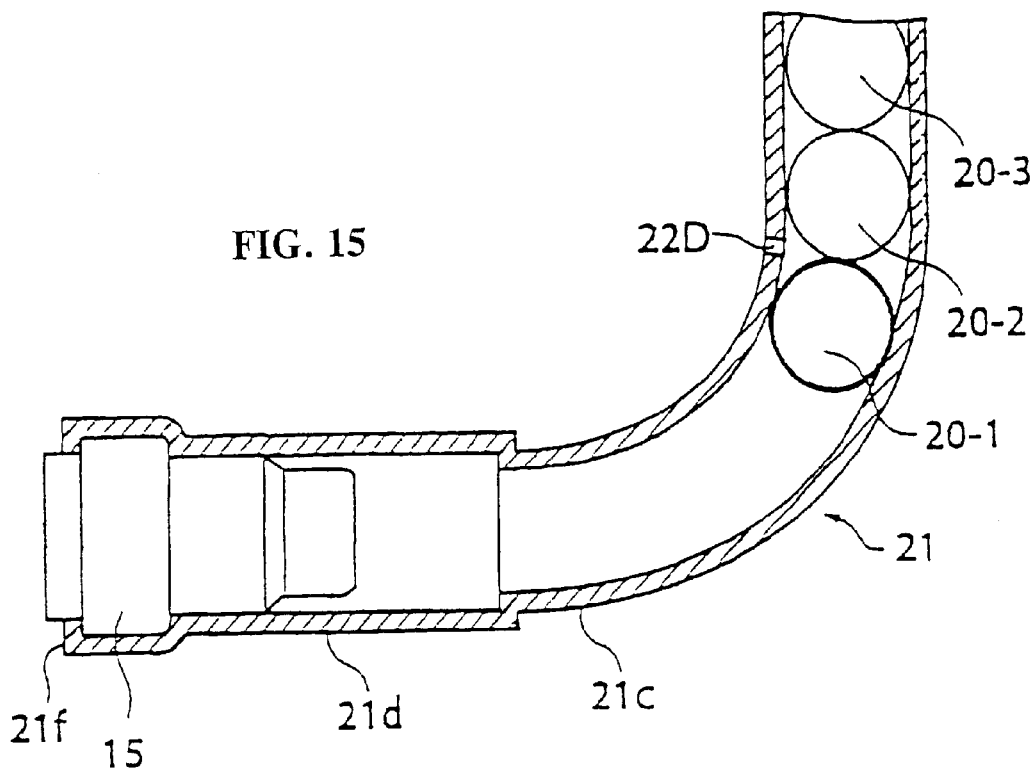
FIG. 15 is a frontal cross-sectional view illustrating the configuration of the pipe base portion of the pretensioner according to the seventh embodiment of the present invention.
Figures 16A, 16B, 16C:
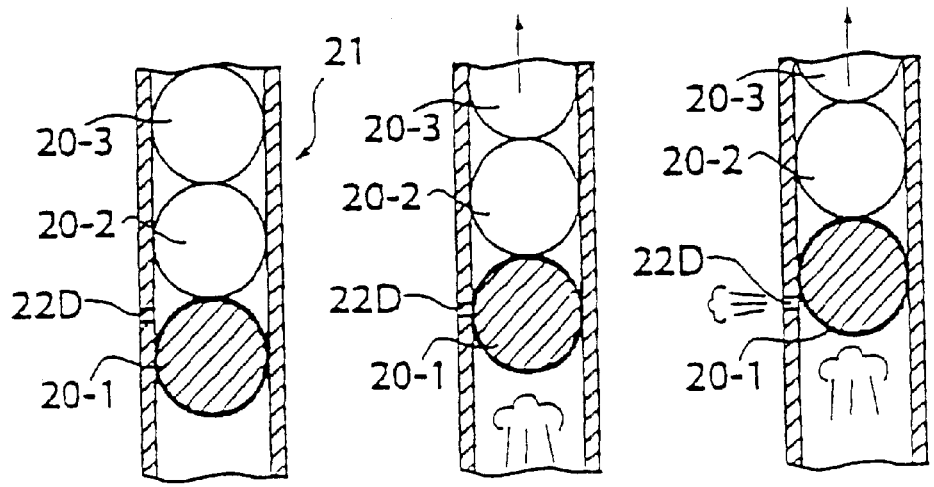
FIGS. 16(A) through (C) are each frontal cross-sectional views for describing the operating state of the pretensioner shown in FIG. 15.
Figure 17A:
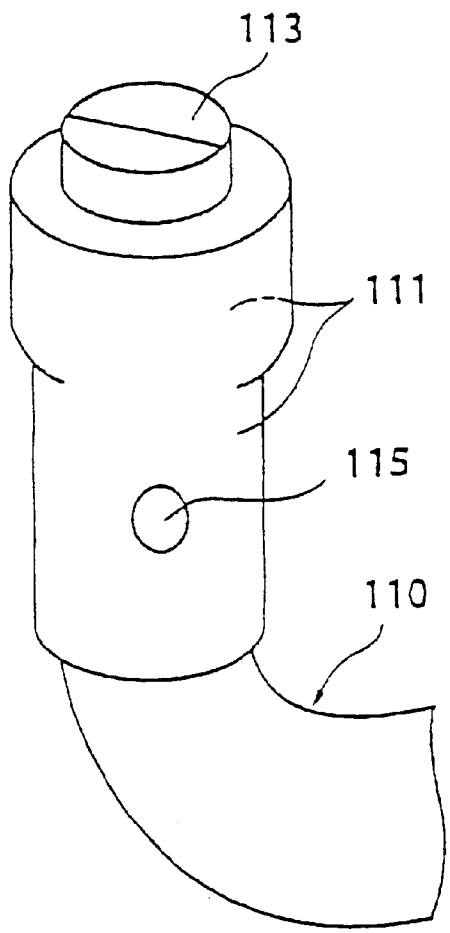
FIG. 17(A) is a perspective view illustrating the configuration of the pipe base portion of the a conventional pretensioner.
Figure 17B:
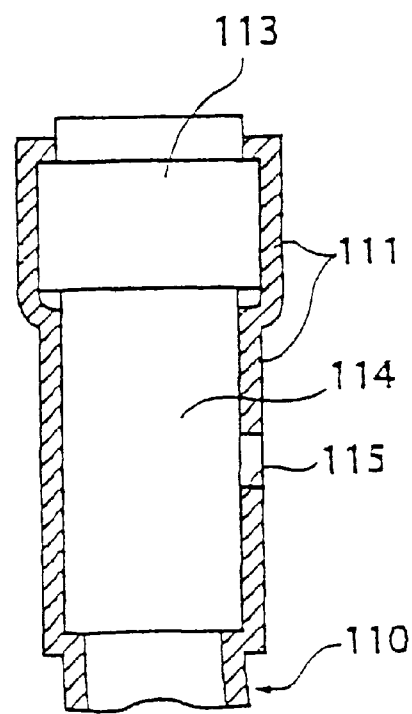
FIG. 17(B) is a frontal cross-section view of the same.

The following is a description of the seventh embodiment of the present invention, with reference to FIG. 15 and FIG. 16. FIG. 15 is a frontal cross-sectional view illustrating the configuration of the pipe base portion of the pretensioner according to the seventh embodiment of the present invention. FIGS. 16(A) through (C) are each frontal cross-sectional views for describing the operating state of the pretensioner shown in FIG. 15.

With the pretensioner shown in these drawings, a small hole 22D is formed in the side wall of the pipe 21 at the portion positioned between the ball 20-1 closest to the gas generator 15 (i.e., the piston) and the ball 20-2. The diameter of this small hole 22D is such that necessary pressure can be maintained during normal operation of the pretensioner, and that the pressure does not rise to high in the event that the piston 20-1 only moves minimally.

At the time of the pretensioner operating, the inner circumference surface of the pipe 21 is sealed by the piston 20-1 until the pinion 23 and ring gear 30 (FIGS. 1 through 4) mesh, and so normal gas pressure operates. Subsequently, once the piston 20-1 passes the small hole 22D, a portion of the gas leaks from this small hole 22D. However, pressure necessary for normal operation is maintained, so the pretensioner normally operates properly. On the other hand, even in the event that there is some abnormality and the movement of the balls 20 is not smooth, the pressure within the pipe 21 is not excessive.

As can be clearly understood from the above description, according to the present invention, the reliability of the overall apparatus can be improved by discharging gas appropriately and reducing the gas pressure in the event that the gas pressure within the pipe rises excessively. Further, there are no adverse effects on other equipment at the time of discharging gas, and safety can be improved.

We claim:

1. A pretensioner for rotating the take-up shaft of a seatbelt in the take-up direction in the event of an emergency to provide the belt with pretension, said pretensioner comprising:
    a gas generator;
    a driving member moved by the gas generated by the gas generator;
    a path for storing and guiding the driving member;
    a channel for guiding said gas to said path;
    a mechanical connection for converting the motion of the driving member into force for rotating said take-up shaft; and
    a gas bypass mechanism for discharging said gas out from said channel in the event that internal pressure exceeding a certain pressure is applied to said channel, including a hole provided to the side wall of said channel and a plugging material which normally plugs off said hole.

2. The pretensioner of claim 1, wherein said plugging material is a rivet.

3. The pretensioner of claim 1, wherein two of said holes are provided opposing each other in the cross-sectional radial direction of said channel, and wherein said plugging material is a through rivet plugging both holes.

4. The pretensioner of claim 2, wherein an O-ring is introduced between the outer surface of said channel and the head of said rivet.

5. The pretensioner of claim 3, wherein an O-ring is introduced between the outer surface of said channel and the opposing heads of said through rivet.

6. The pretensioner according to claim 1, wherein said plugging member is a resin cap having an air hole, said resin cap arranged such that the air hole is plugged in the event that the internal pressure of said channel is the normal gas generator generating pressure; and said resin cap detaching from the channel in the event that the internal pressure within said channel exceeds said certain pressure.

7. A pretensioner for rotating the take-up shaft of a seatbelt in the take-up direction in the event of an emergency to provide the belt with pretension, said pretensioner comprising:
    a gas generator;
    a driving member moved by the gas generated by the gas generator;
    a path for storing and guiding the driving member;
    a channel for guiding said gas to said path;
    a mechanical connection for converting the motion of the driving member into force for rotating said take-up shaft; and
    a gas bypass mechanism for discharging said gas out from said channel in the event that internal pressure exceeding a certain pressure is applied to said channel, including a hole provided to the side wall of said channel and a sleeve having a protrusion protruding into said hole disposed within said channel.

8. A pretensioner for rotating the take-up shaft of a seatbelt in the take-up direction in the event of an emergency to provide the belt with pretension, said pretensioner comprising:
    a gas generator;
    a driving member moved by the gas generated by the gas generator;
    a path for storing and guiding the driving member;
    a channel for guiding said gas to said path;
    a mechanical connection for converting the motion of the driving member into force for rotating said take-up shaft; and
    a gas bypass mechanism for discharging said gas out from said channel in the event that internal pressure exceeding a certain pressure is applied to said channel, including a tear line that tears in the event that said certain pressure is exceeded.

9. The pretensioner of claim 8, wherein said gas bypass mechanism comprises a hole opened in the side wall of said channel, and wherein this hole is plugged off by the material to which said tear line is provided.

10. A pretensioner for rotating the take-up shaft of a seatbelt in the take-up direction in the event of an emergency to provide the belt with pretension, said pretensioner comprising:
    a gas generator;
    a driving member moved by the gas generated by the gas generator;
    a path for storing and guiding the driving member;
    a channel for guiding said gas to said path;
    a mechanical connection for converting the motion of the driving member into force for rotating said take-up shaft; and
    a gas bypass mechanism for discharging said gas out from said channel in the event that internal pressure exceeding a certain pressure is applied to said channel, including a keeper for fixing said gas generator at the end portion of said channel and configured such that a gap is created between said keeper and channel in the event that said certain pressure is exceeded, the keeper having a hole in a side wall normally covered by the surface of the gas generator.

11. The pretensioner of claim 10, further comprising an elastic material positioned between said keeper and said gas generator, wherein said hole is uncovered in the event of abnormal pressure due to compression of the elastic member which allows movement of the gas generator thereby uncovering the hole.

12. A pretensioner for rotating the take-up shaft of a seatbelt in the take-up direction in the event of an emergency to provide the belt with pretension, said pretensioner comprising:

a gas generator;

a driving member moved by the gas generated by the gas generator;

a path for storing and guiding the driving member;

a channel for guiding said gas to said path;

a mechanical connection for converting the motion of the driving member into force for rotating said take-up shaft; and a gas bypass mechanism for discharging said gas out from said channel in the event that internal pressure exceeding a certain pressure is applied to said channel;

wherein said path is a channel and said driving member moves along the inner surface of said channel;

and wherein a piston is further provided to the end of said driving member, and a small hole is opened in the side wall of the channel at the position where this piston passes in the initial stage of being moved;

and wherein the diameter of said small hole is of a size which allows pressure necessary for normal operation to be maintained within the channel and also does not allow a pressure exceeding said certain pressure in the event that the movement of said piston is obstructed.

* * * * *